United States Patent [19]

Stover et al.

[11] 4,102,153
[45] Jul. 25, 1978

[54] NON-JAMMING SHEAR PIN ASSEMBLY

[75] Inventors: David Emmert Stover; Alvin Lewis Menzel, both of Dubuque, Iowa

[73] Assignee: Deere & Company, Moline, Ill.

[21] Appl. No.: 789,363

[22] Filed: Apr. 21, 1977

[51] Int. Cl.² ............................................. F16D 9/00
[52] U.S. Cl. .................................................. 64/28 R
[58] Field of Search ................................. 64/28 R, 10

[56] References Cited

U.S. PATENT DOCUMENTS

| | | | |
|---|---|---|---|
| 2,566,690 | 9/1951 | Wright | 64/28 R |
| 2,744,396 | 5/1956 | Nagy et al. | 64/28 R |
| 2,748,578 | 6/1956 | Potts | 64/28 R |

*Primary Examiner*—Milton S. Mehr

[57] ABSTRACT

A tree harvesting machine has delimbing knives which are fixed to arms having hubs fixed, by means of a shear pin assembly, to a rock shaft. The shear pin assembly includes a pair of headed pins which are inserted into opposite ends of first and second axially aligned bores respectively extending diametrically through the hub and shaft. A pair of retaining clips are secured to the hub by and are respectively urged against the pin heads by a pair of cap screws. The pins are dimensioned such that their respective inner ends are spaced from each other when the pins are installed.

5 Claims, 4 Drawing Figures

NON-JAMMING SHEAR PIN ASSEMBLY

BACKGROUND OF THE INVENTION

The present invention relates to shear pin assemblies and more specifically relates to such assemblies for connecting the hub of a driven member to a rock or drive shaft.

The idea of connecting the hub of a driven member to a drive member by means of a shear pin assembly including a pin designed to shear at a predetermined load so as to prevent the transfer of overloads between the drive and driven members is notoriously old. More specifically, it is known to provide the hub and shaft with diametrically positioned cross bores and to install the hub on the shaft by placing it over the latter with the cross bores in alignment and with a shear pin inserted in the cross bores and retained therein by some means.

The above-described known shear pin assembly is satisfactory when the shear strength requirement is such that a relatively soft pin can be used. However, it is not satisfactory when the shear strength requirement is such that a relatively hard pin must be used since when the pin of such an assembly begins to shear, it often is caused to "smear" the shear surface (shaft to hub interface in the vicinity of the pin) and deforms the edges of the cross bores at the interface such as to make the removal of the sheared pieces very difficult. Further, the irregular sheared surfaces cause an elongated pin piece which is not easily deformed by the hub so this pin piece in the shaft often wedges the hub on the shaft in a position wherein the cross bores are misaligned thus requiring heavy tools to bring the bores back into alignment to permit the removal of the pin piece. Additionally, it has been found that the pin piece in the shaft may score the inside of the hub of the driven member and after several "shears" the edge of the cross bore of the hub in the vicinity of the pin will be severely deteriorated and may make replacement of the driven member necessary.

SUMMARY OF THE INVENTION

According to the present invention there is provided an improved shear pin assembly for securing the hub of a driven member to a drive shaft.

A broad object of the invention is to provide a shear pin assembly which serves as an effective protective device against overloads, is easy to service and does not damage the shear interface.

A more specific object is to provide a shear pin assembly arranged such that the sheared pin pieces will move away from the shear interface.

These and other objects will become apparent from a reading of the ensuing description together with the appended drawing.

The shear pin assembly for carrying out the above-noted objects includes a pair of headed shear pins inserted into opposite ends of a throughbore arrangement defined by axially aligned bores extending diametrically through the hub of a driven member and through a drive shaft. The inner ends of the shear pins are spaced from each other in the bore of the drive shaft so as to permit sheared pieces of the pins to move axially away from the shear interface. The shear pins are respectively held in place by a pair of clips respectively secured to the hub by a pair of cap screws.

DESCRIPTION OF THE PREFERRED EMBODIMENT

Figure 1:
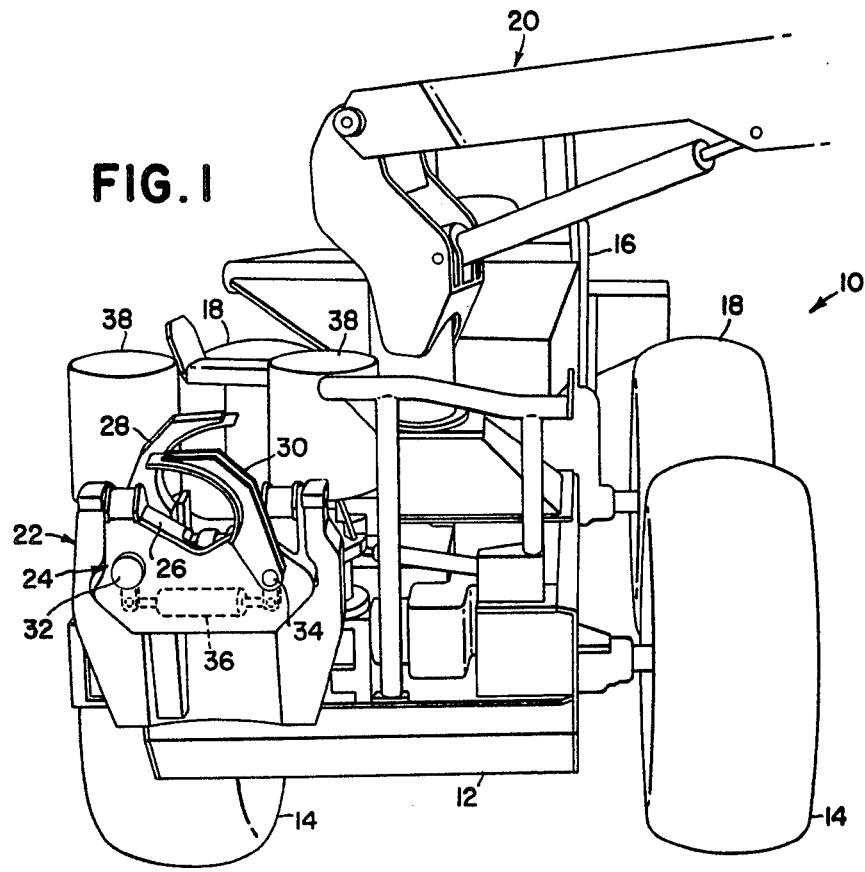
FIG. 1 is a front perspective view of a tree harvesting vehicle embodying the present invention.

Referring now to FIG. 1, therein is shown a tree harvesting vehicle indicated in its entirety by the reference numeral 10. The vehicle 10 includes a front section 12 supported on a pair of drive wheels 14 and a rear section 16 supported on a pair of drive wheels 18. The front and rear sections 12 and 16 are connected together by a vertical pivot assembly, not shown, which permits the sections to be articulated relative to each other for steering the vehicle. Mounted on the front section 12 for swinging from side-to-side of the vehicle is a boom structure 20 which supports a shear head (not shown) for felling standing trees and then positioning the latter for being delimbed by means of a delimbing assembly 22 located on the right side of the section 12. Specifically, the delimbing assembly 22 includes a delimbing blade support sub-frame 24 having a stationary V-shaped blade 26 fixed thereon and right and left arcuately curved blades 28 and 30, respectively mounted on right and left fore-and-aft extending rock shafts 32 and 34 journaled in the sub-frame 24 and operated by means of a hydraulic actuator 36 for selectively swinging the blades away from each other, to permit the trunk of a tree to be placed on the stationary blade 26, and toward each other for cooperating with the blade 26 to encircle a tree trunk resting thereon. Provided for pulling a tree trunk through the delimbing blades are a pair of feed rolls 38 mounted, in a manner not shown, for movement towards and away from each other to permit the trunks of trees to be inserted therebetween and gripped thereby.

When placing a sheared tree so that its trunk rests on the blade 26 and extends between the feed rolls 38, the operator may accidentally force the tree being positioned, or the shear head carried by the boom structure 20, against one or the other of the swingable blades 28 and 30. In order to prevent the mechanism for swinging the blades from being damaged as a result of the forces developed by such contact, the blades 28 and 30 are mounted on the rock shafts 32 and 34 by means of shear pin assemblies.

Figures 2, 3:
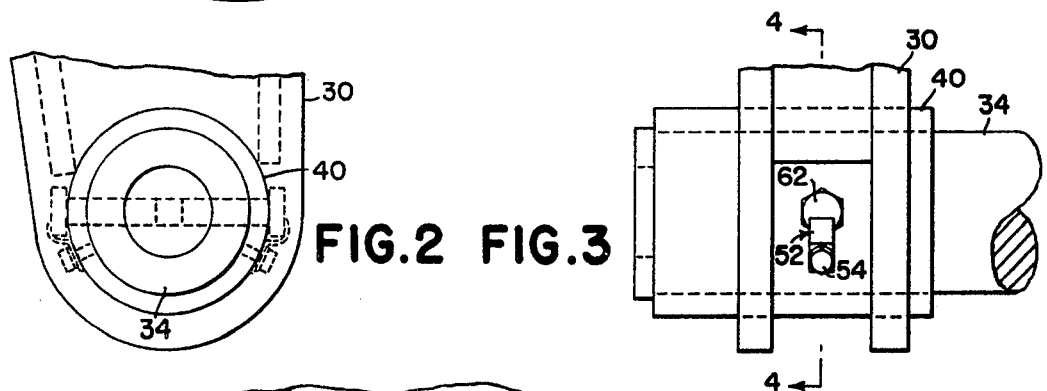
FIG. 2 is an end view showing the connection between a shear blade hub and a shear blade rock shaft.
FIG. 3 is a side view of the assembly shown in FIG. 2.
Figure 4:
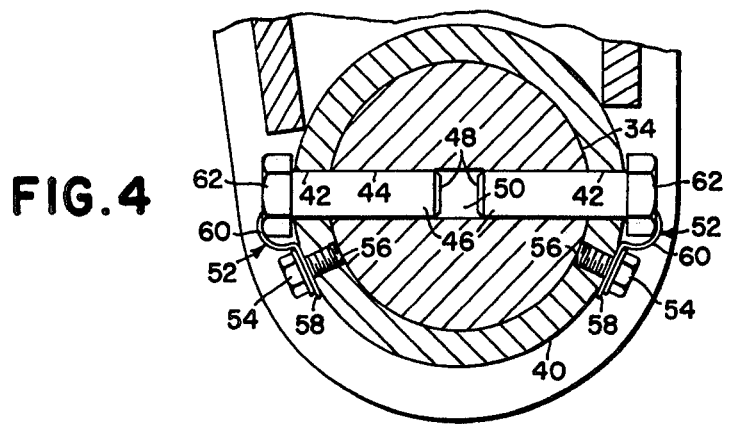
FIG. 4 is an enlarged sectional view taken along the line 4—4 of FIG. 3.

Specifically, referring now to FIGS. 2–4, where only the left blade 30 and rock shaft 34 are shown, it can be seen that the blade 30 includes a hub 40 received on the shaft 34. The hub 40 and the shaft 34 are respectively provided with diametrically extending through bores 42 and 44 which are in axial alignment with each other to thus define a bore arrangement. A pair of identical shear pins 46, in the form of unthreaded bolts, are respectively inserted into opposite ends of the bore assembly and have respective inner ends 48 which are spaced from each other, as at 50, and are respectively held in place by a pair of identical retainer clips 52, which are in turn held in place by a pair of capscrews 54 respectively located in a pair of threaded holes 56 in the hub 40. The clips 52 each include a relatively flat, apertured first end portion 58 receiving a respective one of the capscrews 54 and a curved second end portion 60 offset from the end portion 58 and engaged with a respective head 62 of the shear pins 46. The curved, offset portions 60 of the clips 52 are dimensioned such that they become partially deflected during installation as the capscrews 54 are tightened and thus are biasingly loaded against the heads 62 of the pins 46.

In operation, assuming that the blade 30 somehow becomes loaded to the extent that the shear forces exerted on the pins 48 exceed their shear strength, they will begin to shear and the pieces of each on opposite sides of the shear plane will move axially, the axial movement of the respective outer pieces being accommodated by further deflection of the clips 52 and the axial movement of the inner pieces being accommodated by the space 50 between the respective inner ends 48 of the pins 46. This axial movement during shear is important as it results in the eventually-sheared pieces being displaced from the shear plane sufficiently to prevent them from smearing at the shear plane and from wedging the hub 40 on the shaft 34.

Once the pins 46 are sheared, they may easily be replaced by loosening the clips 52 and engaging a gripping tool and/or prying tool with the heads 62 of the outer sheared pin pieces and withdrawing the latter. Since the hub 40 is now free to rotate on the shaft 34, it is rotated until the bore 42 of the hub is aligned with the bore 44 of the shaft. A knock-out punch then may be used to dislodge the inner pieces of the sheared pins. Once this is accomplished, the replacement pin may be installed and the clips 52 re-tightened. It is noted that since the clips 52 do not have to be removed during replacement of sheared pins, there is no possibility of losing the clips 52 or capscrews 54 in the field during the replacement operation.

We claim:

1. In combination with a drive shaft having a circular cross section and a driven element having a hub provided with a circular opening in which the drive shaft is received, a shear pin assembly for fixing the driven member to the drive shaft, comprising: a first through bore extending through the shaft; a second through bore extending through said hub and axially aligned with said first through bore; and a pair of shear pins positioned in the first and second through bores and having head ends positioned against the hub at opposite ends of the second through bores and having inner ends axially spaced from each other and located in said first through bore; and retaining means extending between the hub and head ends of the shear pins and releasably holding the shear pins in position.

2. The combination defined in claim 1, wherein the retaining means includes a pair of yieldable retaining clips respectively releasably secured to the hub and against the head ends of the shear pins by a pair of capscrews extending therethrough and into the hub.

3. In combination with a drive shaft having a circular cross section and a driven element having a hub provided with a circular opening in which the drive shaft is received, a shear pin assembly for fixing the driven member to the drive shaft, comprising: a bore arrangement extending through the hub and drive shaft and having opposite ends; first and second shear pins inserted into said bore arrangement respectively from said opposite ends; said pins having respective inner ends spaced from each other in said bore arrangement; and axially yieldable retaining means releasably securing said shear pins in place.

4. The combination defined in claim 3 wherein each pin includes an enlarged head located exteriorly of the hub; and said retaining means engaging the head of each pin.

5. The combination defined in claim 4, wherein the retaining means includes a pair of yieldable retaining clips respectively releasably secured to the hub and against the head ends of the shear pins by a pair of capscrews extending therethrough and into the hub.

* * * * *